US008040356B2

(12) United States Patent
Stokes

(10) Patent No.: US 8,040,356 B2
(45) Date of Patent: Oct. 18, 2011

(54) COLOR MANAGEMENT USER INTERFACE

(75) Inventor: Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 11/731,436

(22) Filed: Mar. 30, 2007

(65) Prior Publication Data

US 2008/0244412 A1    Oct. 2, 2008

(51) Int. Cl.
*G09G 5/02* (2006.01)
(52) U.S. Cl. ........................................ 345/594; 345/589
(58) Field of Classification Search ........... 345/589–605
See application file for complete search history.

(56) References Cited

U.S. PATENT DOCUMENTS

| | | | |
|---|---|---|---|
| 4,985,853 A | | 1/1991 | Taylor et al. |
| 5,298,993 A | | 3/1994 | Edgar et al. |
| 5,309,257 A | | 5/1994 | Bonino et al. |
| 5,345,550 A | * | 9/1994 | Bloomfield ................ 715/841 |
| 5,491,568 A | | 2/1996 | Wan |
| 5,537,516 A | | 7/1996 | Sherman et al. |
| 5,764,913 A | * | 6/1998 | Jancke et al. ............... 709/224 |
| 5,805,166 A | * | 9/1998 | Hall et al. ................... 715/839 |
| 5,806,081 A | | 9/1998 | Swen et al. |
| 5,956,044 A | | 9/1999 | Giorgianni et al. |
| 6,075,888 A | | 6/2000 | Schwartz |
| 6,161,176 A | * | 12/2000 | Hunter et al. ................ 713/1 |
| 6,344,862 B1 | * | 2/2002 | Williams et al. ............ 715/781 |
| 6,525,721 B1 | * | 2/2003 | Thomas et al. ............. 345/600 |
| 6,642,931 B1 | | 11/2003 | Haikin et al. |
| 6,724,409 B1 | * | 4/2004 | Maddocks et al. .......... 715/853 |
| 6,741,262 B1 | * | 5/2004 | Munson et al. ............. 345/594 |
| 6,963,908 B1 | * | 11/2005 | Lynch et al. ................. 709/220 |
| 7,080,058 B1 | | 7/2006 | Upadhyayula et al. |
| 7,102,648 B1 | | 9/2006 | Holub |
| 2003/0117639 A1 | * | 6/2003 | Milton et al. ................ 358/1.13 |
| 2005/0100211 A1 | * | 5/2005 | Gibson et al. ............... 382/162 |
| 2005/0114500 A1 | * | 5/2005 | Monk et al. ................. 709/224 |
| 2005/0257268 A1 | * | 11/2005 | Guo et al. ...................... 726/25 |

OTHER PUBLICATIONS

Chen, et al., "Using UML to Create a Color Management System", http://www.taga.org/members/2003Proceedings/documents/TAGA2003pages63-81.pdf.
Goesele, et al., "Color Calibrated High Dynamic Range Imaging with ICC Profiles", http://www.cs.washington.edu/homes/goesele/download/Goesele-2001-CCH.pdf.
Jin-Seo, et al., "Development of color management system prototype", Date: 1998, http://ieeexplore.ieee.org/iel4/5875/15661/00725038.pdf?isNumber=.

* cited by examiner

*Primary Examiner* — Xiao Wu
*Assistant Examiner* — Charles Tseng

(57) ABSTRACT

Various embodiments described above provide a user interface system that can expose end users and others to color management information in an easy-to-understand manner. In one or more embodiments, the user interface system can provide information that allows the user to easily ascertain whether a device, component or application is color managed, and the status of the device, component or application. Further, the user interface system can enable the user to access links that provide additional information and/or diagnostic help in the event a color management issue is identified.

20 Claims, 11 Drawing Sheets

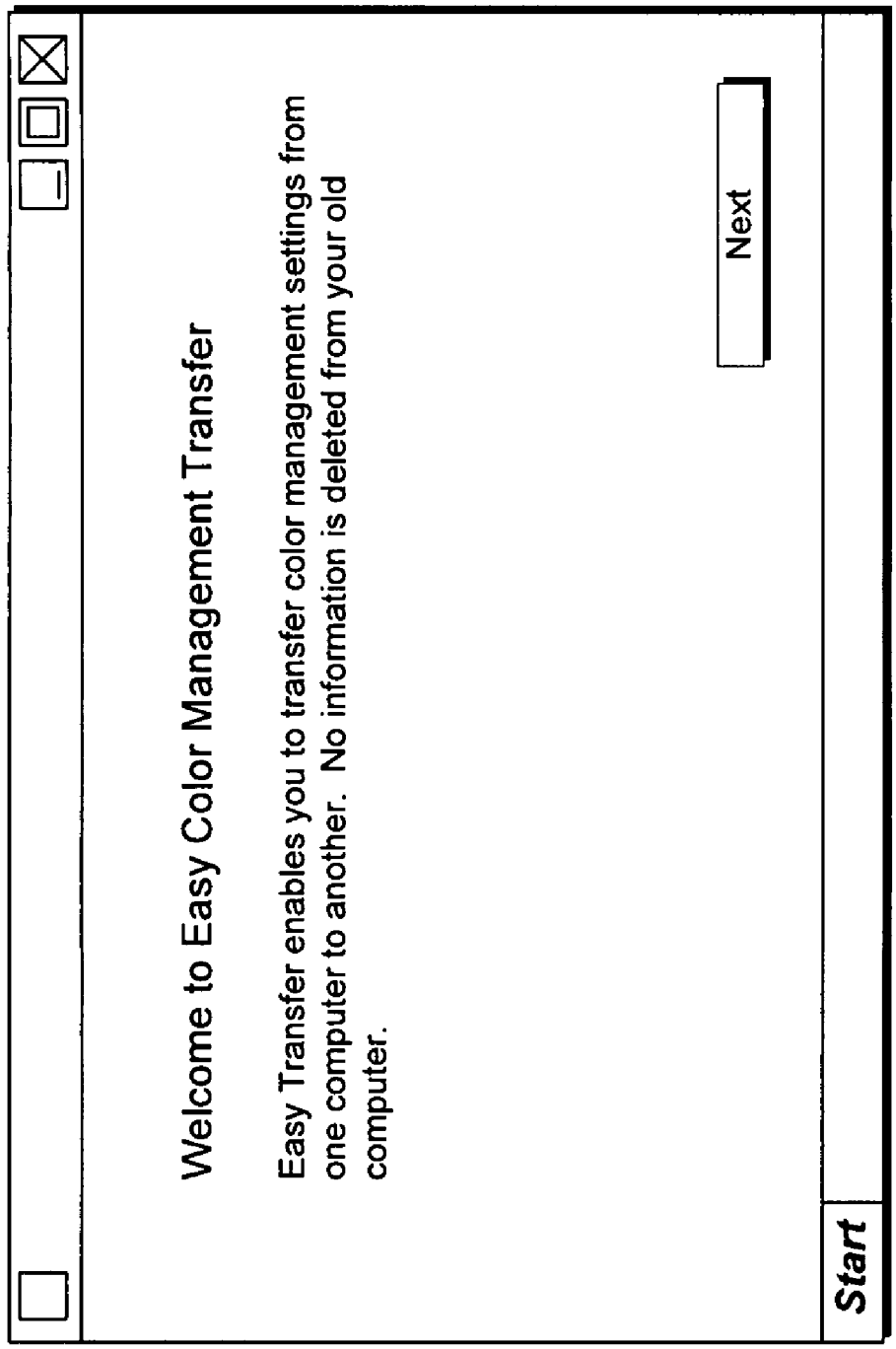

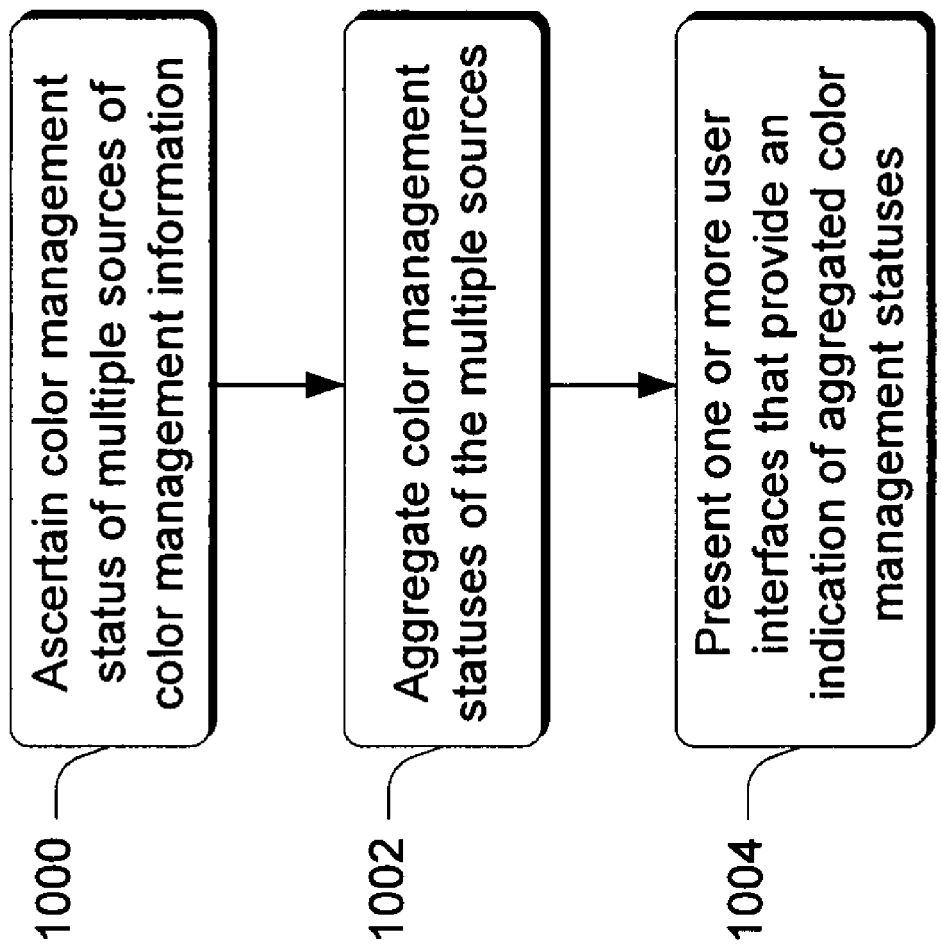

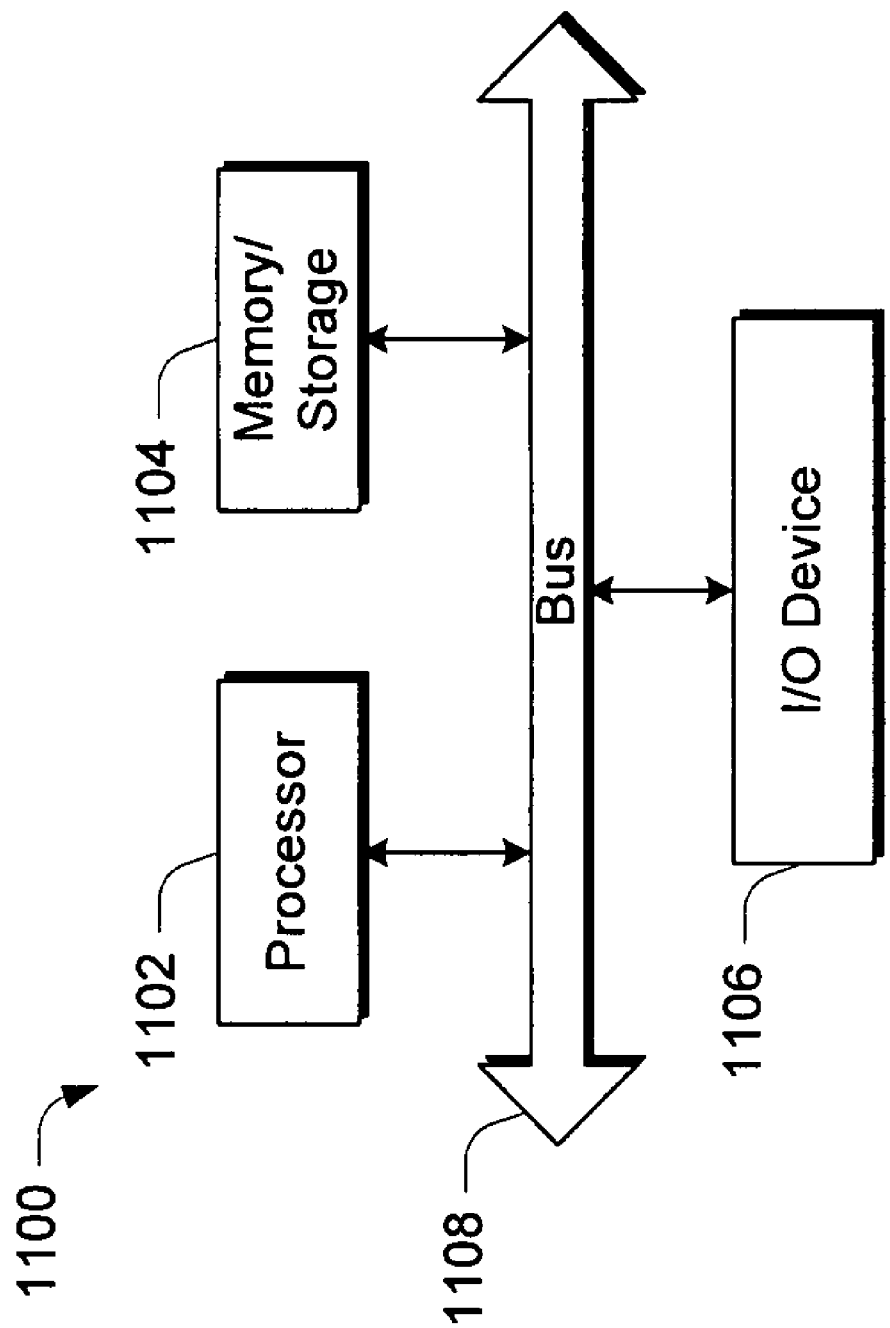

COLOR MANAGEMENT USER INTERFACE

BACKGROUND

Many end users desire true and high quality color fidelity of the content with which they interact in various scenarios. For example, a user may browse the Web to search for a particular shirt they wish to purchase. Once they find the shirt, they may print a product description, including a picture of the shirt, on a color printer. A reasonable user expectation in this instance is that the printed product description would bear a desirable color likeness to the actual color of the shirt.

Other reasonable user expectations include those that would expect color digital pictures to maintain the same color appearance when consumed on a different computing device, such as a home computer or other display device.

One of the major issues for consistency in color management is that color is very dependent on each component that is part of a workflow that processes images and other data with associated color. If one component in a workflow is not working properly, then the whole color management scheme can break down.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a user interface system that can expose end users and others to color management information in an easy-to-understand manner. In one or more embodiments, the user interface system can provide information that allows the user to easily ascertain whether a device, component or application is color managed, and the status of the device, component or application. Further, the user interface system can enable the user to access links that provide additional information and/or diagnostic help in the event a color management issue is identified.

In one or more embodiments, the user interface system comprises a collection of hierarchically-arranged user interface windows that can enable a user to quickly drill down to appropriate levels associated with color management of their device, component or application. The hierarchically-arranged user interface windows provide an intuitive and logical color management solution.

BRIEF DESCRIPTION OF THE DRAWINGS

The same numbers are used throughout the drawings to reference like features.

FIG. 9 illustrates an example user interface in accordance with one or more embodiments.

FIG. 10 is a flow diagram that describes steps in a method in accordance with one or more embodiments.

FIG. 11 illustrates an example system that can be used to implement one or more embodiments.

DETAILED DESCRIPTION

Overview

Various embodiments provide a user interface system that can expose end users and others to color management information in an easy-to-understand manner. In one or more embodiments, the user interface system can provide information that allows the user to easily ascertain whether a device, component or application is color managed, and the status of the device, component or application. Further, the user interface system can enable the user to access links that provide additional information and/or diagnostic help in the event a color management issue is identified.

In one or more embodiments, the user interface system comprises a collection of hierarchically-arranged user interface windows that can enable a user to quickly drill down to appropriate levels associated with color management of their device, component or application. The hierarchically-arranged user interface windows thus provide an intuitive and logical color management solution.

Example System

Figure 1:
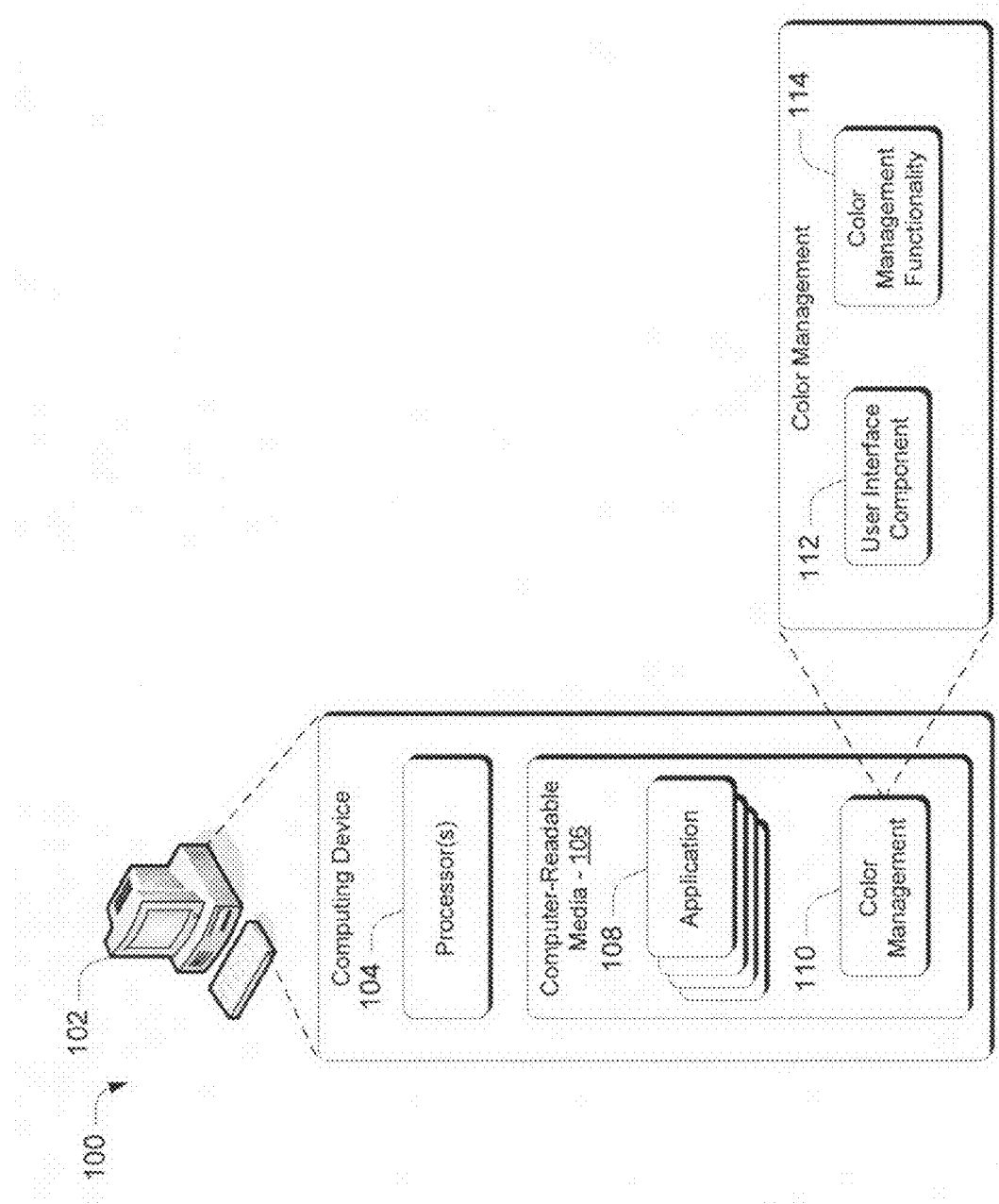
FIG. 1 illustrates a system in which various principles described herein can be employed in accordance with one or more embodiments.

FIG. 1 illustrates a system in accordance with one or more embodiments, generally at 100. System 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 11

In addition, computing device 102 includes software in the form of a color management module 110. As shown, in one or more embodiments, color management module 110 comprises a user interface component 112 and color management functionality 114.

The user interface component is operational to provide the functionality described above and below. Specifically, in one or more embodiments, the user interface component can provide a user interface experience in which a user can easily and quickly ascertain the color management status of various devices, applications or components. Further, the user interface component can also provide the means by which a user can robustly interact with the color management functionality of their particular devices, applications or component and further seek out additional information to assist them in color management activities.

The color management functionality 114 can be included as part of the color management module 110 or as a separate component that is leveraged or otherwise used by the user interface component. In operation, the color management functionality includes functionality that is associated with color management activities on a device, application or component. Such can include, by way of example and not limitation, the ability to query or otherwise discover whether or not a device, application or component is color managed and if so, the level of color management. Such functionality can also include the ability to manipulate, change or otherwise operate on color profiles that are associated with devices, applications or components. Further, the color management functionality can include the ability to programmatically interact with a wide variety of other components that are involved in color management, as will be appreciated by the skilled artisan.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

In the discussion that follows, a section entitled "Color Management" is provided and briefly describes various aspects associated with color management. Following this, a section entitled "Example User Interface" is provided and describes various examples of user interfaces that can be utilized in one or more embodiments. After this section, a section entitled "Example Method" is provided and describes color management methods that can be employed in accordance with one or more embodiments. Lastly, a section entitled "Example System" is provided and describes an example system that can be used to implement one or more embodiments.

Color Management

Conceptually, being color managed refers to whether a device, application or component can communicate with other components its color characteristics and whether those characteristics can be tuned or otherwise manipulated. In at least some systems, color management refers to or otherwise impacts a couple of different features—color profiles and gamut mapping.

A color profile typically defines the meaning of numeric color image data, e.g. RGB. There are many different types of color profiles. Profiles can define color in devices (e.g. scanners, digital cameras, printers and the like) or image color spaces. All digital images refer to a color space—either explicitly via an embedded or user-specified profile, or implicitly.

Gamut mapping refers to a transformation that takes place when an image is transferred between formats or devices. For example, gamut mapping is employed when transforming from one color space to another, from an image in memory to a monitor, or from an image in memory to a printer to name just a few.

A color-managed workflow can use application programs to perform a couple of different tasks. First, the programs can recognize color spaces and device profiles. Second, the programs can apply the appropriate gamut mapping when transferring images. These programs can perform a variety of color management tasks such as building or obtaining profiles, evaluating the quality of the profiles, setting up workflows to use the profiles properly, choosing the correct working color space, dealing with images that do not have embedded profiles, which rendering intent(s) to choose for "reasonable" color rendition and the like.

As an example, for a device such as a printer, being color managed can refer, in some instances, to whether a color profile can be associated with the printer and whether the color profile can be updated with a more accurate profile that characterizes the device. Further, being color managed can refer to the ability to ascertain, for the printer, whether its particular color profile is indeed being used.

In the FIG. 1 example, color management functionality such as that described above and others, can be provided by color management functionality 114.

Example User Interface

In the discussion that follows, example user interfaces are provided and illustrate various ways that can expose end users and others to color management information in an easy-to-understand manner. In one or more embodiments, the user interface system can provide color management information that allows the user to easily ascertain whether a device, component or application is color managed, and the status of the device, component or application. Further, the user interface system can enable the user to access links that provide additional information and/or diagnostic help in the event a color management issue is identified. It is to be appreciated and understood that the specific user interfaces that are illustrated constitute but examples. As such, other user interfaces that are different from and/or additional to those that are shown can be utilized without departing from the spirit and scope of the claimed subject matter.

Figure 2:
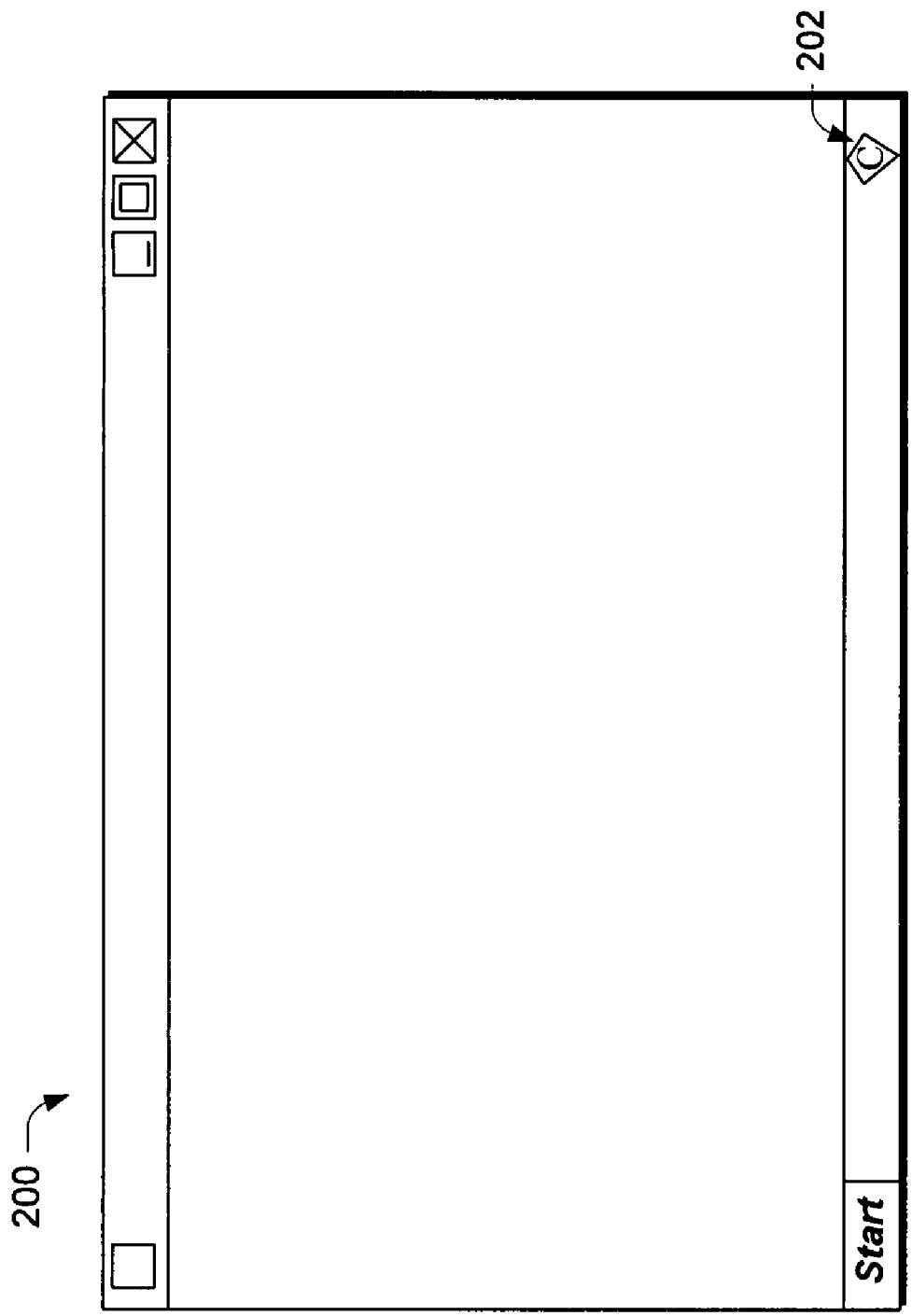
FIG. 2 illustrates an example user interface in accordance with one or more embodiments.

FIG. 2 illustrates an exemplary user interface, in accordance with one or more embodiments, generally at 200. Here, the user interface can comprise any suitable user interface that one might encounter. In this particular example, a Start bar appears at the bottom of the user interface and includes an icon 202 that is associated with color management and can inform the user of the general status of the color management of their particular system. Any suitable icon can be used. In addition, the icon can have a number of states associated with the color management status of their devices, applications or components. In one or more embodiments, the icon can be color coded to provide a quick visual reference from which a user can ascertain, at a glance, the color management status of their system. For example, in one or more embodiments, a green, yellow, red color coding system can be used. In one or more embodiments, the green, yellow and red color codes can be associated with the definitions provided in the table just below.

TABLE 1

Color Management Color Codes

| Color Management Color Code | Definition |
| --- | --- |
| Green | Color management system is Good; no major issues that need addressed; color management is up-to-date and not due for a backup; no actions to take requiring user action. |
| Yellow | Color management system is Fair; usually means that there is an action to take, such as running a tune-up or backup or downloading a non-critical update; there is no immediate threat to the system, but you should take care of the action as soon as possible to return your system to Green. |
| Red | Color management system is At Risk. This can happen if a particular device's, application's or component's color management system has been disabled in some way. Immediate action is recommended to restore the system to Green. |

Color management color codes, such as those described above, can be assigned in any suitable way using any suitable criteria. As various systems and their associated color management schemes can vary, so too can the manner in which color codes are defined and assigned.

Figure 3:
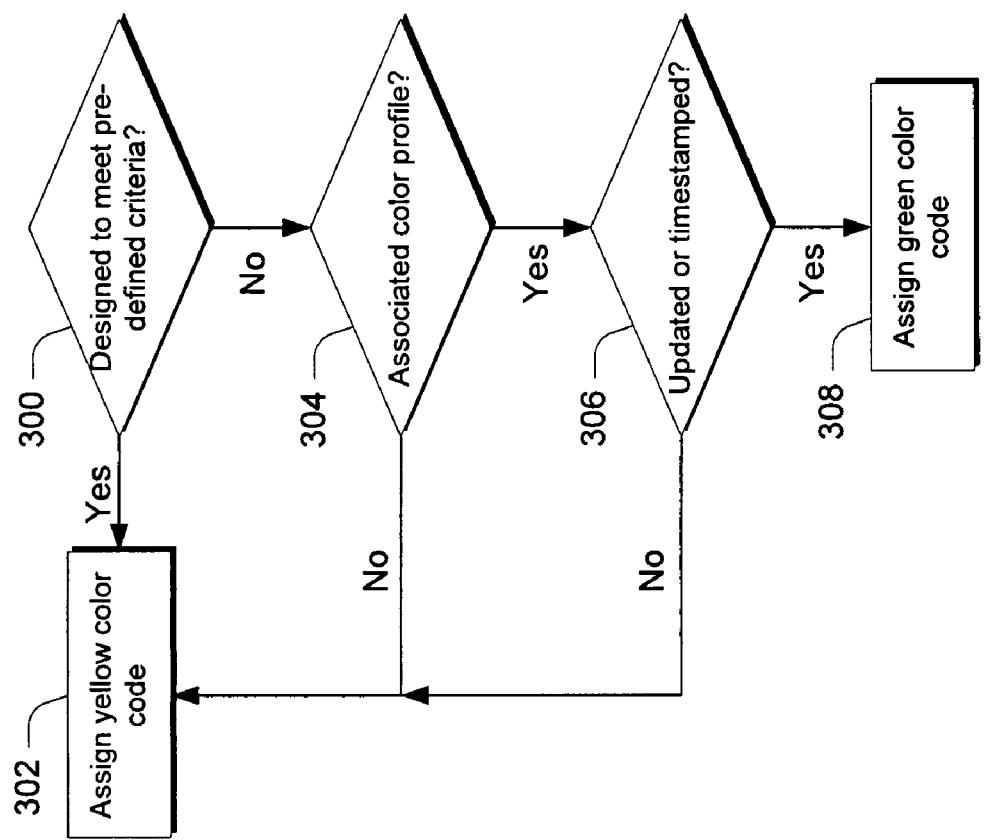
FIG. 3 is a flow diagram that describes steps in a method in accordance with one or more embodiments.

As one example, consider the following in connection with FIG. 3 which illustrates a flow diagram that describes a decision-making process in which color codes can be assigned in one or more embodiments. The method can be performed in connection with any suitable hardware, software, firmware or combination thereof. In one or more embodiments, the method can be performed by a color management module, such as the one shown and described at 110 in FIG. 1.

Assume for purposes of this method, that the color management status of a device is being ascertained. Any suitable device can be utilized examples of which include cameras, printers, displays and the like.

Step 300 ascertains whether the device is designed or manufactured to meet predefined criteria. Any suitable criteria can be utilized. In at least some embodiments, this step ascertains whether the device has been manufactured to meet a particular standard. For example, this step can be performed by determining whether the device is "logoed"—meaning that it has been designed to meet or exceed the color management standards of a particular company or standards body. If the device has been designed to meet the predefined criteria, then step 302 assigns at least a yellow color code to the device. It is possible for a green color code to be assigned after further ascertaining that the device is operating properly and that no major color management issues need resolved. If, on the other hand, the device has not been designed to meet the predefined criteria or it cannot be determined that such is the case, step 304 ascertains whether there is a color profile associated with the device. If there is no color profile associated with the device, then the method branches to step 302 and assigns at least a yellow color code.

If there is a color profile associated with the device, then step 306 ascertains whether the color profile has been updated or time-stamped with a desirably-recent time stamp. If so, step 308 assigns a color code of green to the device. This means that the device is adequately color managed and is up to date. If, on the other hand, the color profile has not been updated or does not bear a desirably-recent timestamp, the method branches to step 302 and assigns a color code of yellow to the device.

This process can be performed for multiple devices that make up a system for purposes that are described below.

Assume now that the color management status of an application is being ascertained. Any suitable application can be the subject of the processing that is to be described. In one or more embodiments, the application can be queried to ascertain if it can be color managed. This can be performed by programmatically interacting with the application, such as by calling a suitably configured application program interface or API that returns color management information. Color codes can then be assigned based on the information that is returned. Alternately or additionally, in some embodiments, the system may have or otherwise support a color policy database that maintains a list of applications, whether they support color management and if so, relevant parameters associated with their color management support. Hence, in embodiments such as these, color codes can be assigned based on information found in the color policy database. Alternately or additionally, in one or more embodiments, much like the device case above, if an application has been designed to meet certain predefined criteria, it can be assigned at least a yellow color code.

This process can be performed for multiple applications on the system for purposes described just below. Likewise, this process or one similar to it can be performed for various system components. Examples of system components can include those that are typically involved in color-related work flows, e.g. clipboard components, extensions to common dialog boxes such as Open File and Print Document, components that ship with operating systems (such as Microsoft's Paint or Picture Gallery), media player components and the like.

In one or more embodiments, once the color management status of the system's devices, application and/or components has been ascertained, a color coded icon 202 (FIG. 2) can be displayed. This color coded icon can, in a sense, aggregate the total color management status of the system and present a somewhat global view of the system's color management. For example, if all of the system's devices, applications and components have green color codes, then the icon can be displayed as a green icon. If one or more of the devices, applications or components have yellow color codes, then a yellow icon can be displayed. If one or more of the devices, applications or components have a red color code, then a red icon can be displayed.

Having now displayed an icon that can aggregate color management status across the system, if a user now selects the icon by, for example, double clicking on the icon, the user can be exposed to additional user interfaces that provide a hierarchically-arranged set of interfaces that can enable the user to ascertain additional information about the color management status of their system. This can allow the user to drill down into the different categories (e.g. devices, applications, or components) and further drill down into specific instances of devices, applications or components.

Figure 4:
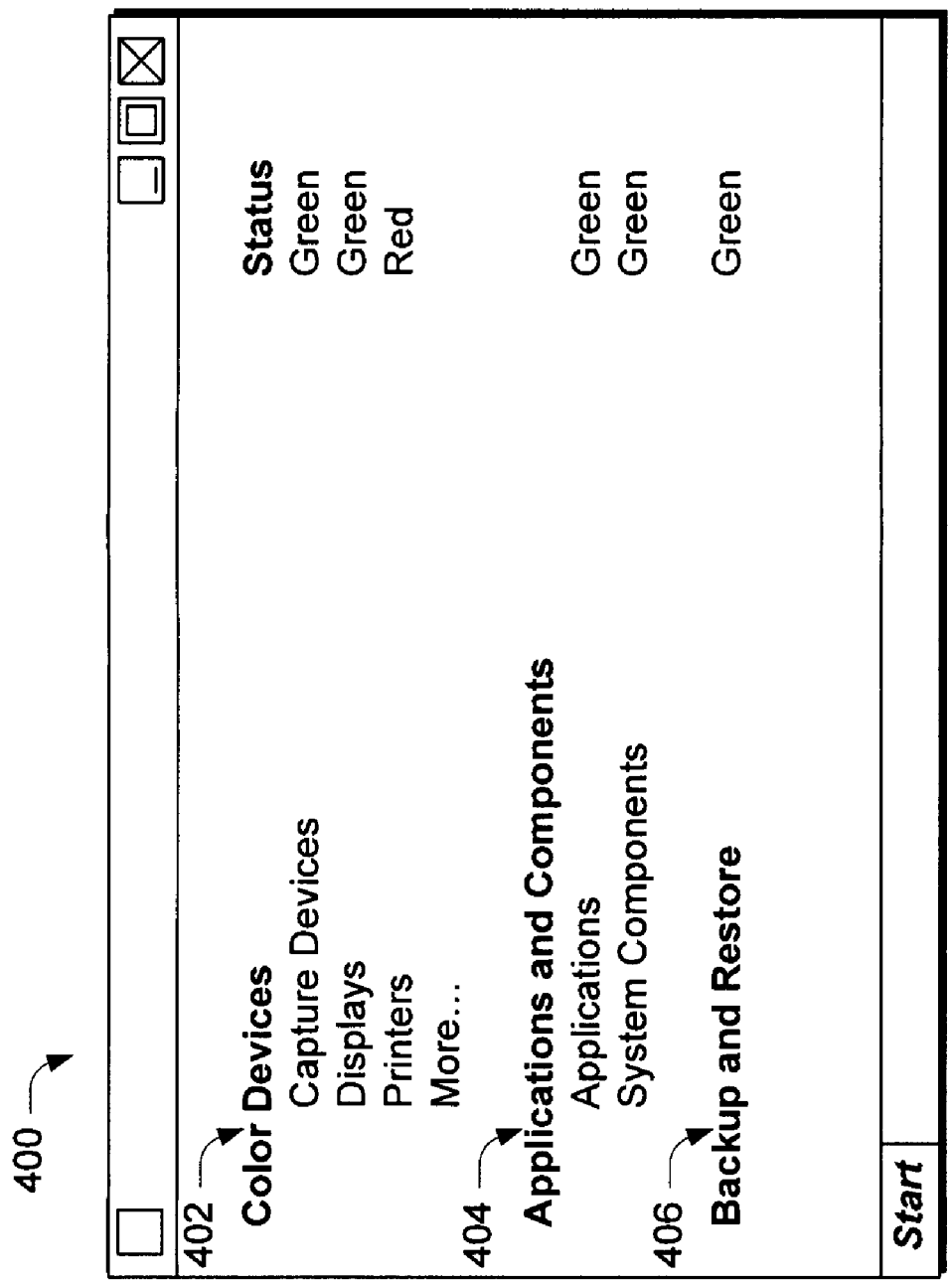
FIG. 4 illustrates an example user interface in accordance with one or more embodiments.

As an example, consider FIG. 4 which illustrates an example user interface 400 that lists various categories that include a color devices category 402, an applications and components category 404 and backup and restore category 406.

In one or more embodiments, individual categories are associated with one or more types, and can aggregate types that appear under them. For example, in the color device category 402, aggregated types include capture device types, display types, printer types and others which are accessible via the "More . . . " field. Likewise, in the application and components category 404, aggregated types include application types and system component types. The backup and restore category 406 is provided to enable a user to backup or restore information associated with color management of their system. For example, a user may wish to backup their color profiles so that they can use their color profiles on other devices. Alternately, a user may have inadvertently changed some color profile settings and now wishes to restore the color profile to its previous state.

In the illustrated and described embodiment, individual categories 402, 404 and 406 are associated with one or more color management color codes. The color management codes can be assigned to the individual categories. Alternately or additionally, the color management codes can be assigned to the individual types within each category. For example, the capture device types, display types and printer types can each, as in FIG. 4, have an associated color code which appears under the "Status" heading. Likewise, the application and system component types under the application and component category can each have an associated color code. Any suitable criteria can be used to ascertain which color code to assign to a particular type. For example, if one instance of a capture device type has a red color code, then the color code for the capture device type might be assigned as red. Likewise, if one or more instances of an application have a yellow color code, then the color code for the application type under the application and component category 404 might be assigned as yellow.

In this example, by clicking on a particular type that is aggregated under an individual category, a user interface that individually describes the instances of that type can be displayed for the user, along with color code information that describes the color management status of that instance. In the FIG. 4 example, the printers type has been assigned a red color code. This means that at least one printer that has been aggregated under this type has a red code. By clicking on the printer type, a user interface that displays the individual printers in the system along with the color management color codes can be presented.

Figure 5:
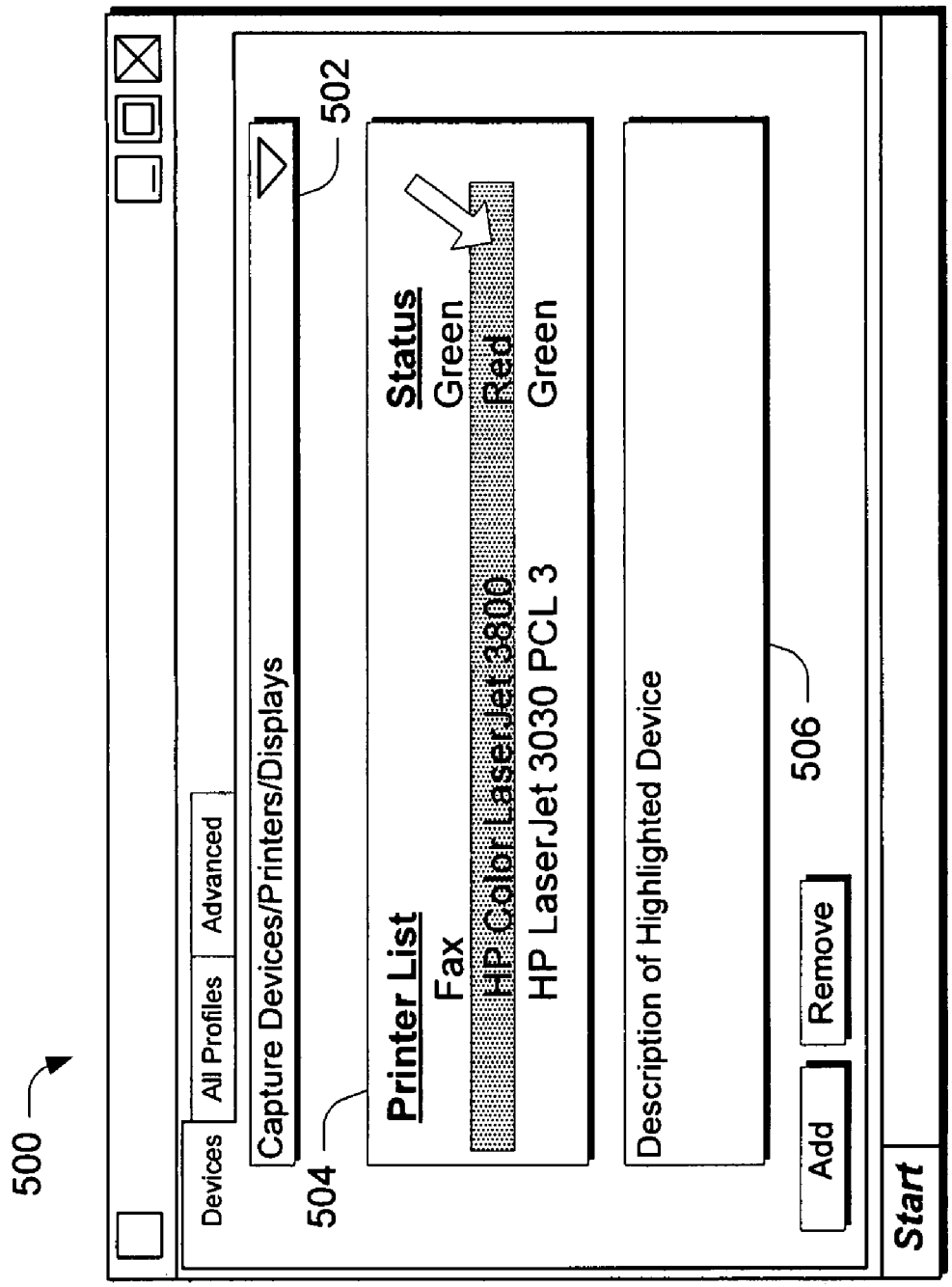
FIG. 5 illustrates an example user interface in accordance with one or more embodiments.

As an example, consider FIG. 5 which shows an example user interface in accordance with one or more embodiments, generally at 500. Here, a device drop down menu 502 can enable a user to select from among the various types of devices that reside in the color device category. In this particular instance, the user previously clicked on the printer type and has been presented with this user interface. In addition, selectable tabs just above the drop down menu 502 are presented and allow a user to select from among "Devices", "All Profiles" and "Advanced Options". The "Devices" tab selects the devices that comprise the user's system. The "All Profiles" tab allows the user to view and manage profiles that are in the user's system. The "Advanced" tab allows the user to access advanced management options. Suitable advanced management options can include, by way of example and not limitation, specification of a preferred intent (such as more saturation for pie charts or best fidelity match for logos and medical images), preferred extension support (e.g., use vendor extensions if available for best fidelity or use no optional extensions in order to optimize for consistency across different users or computing devices), and the like.

In this example, since the user has opted to view printer devices, a window 504 provides a list of printer devices along with their individual color codes. From here, a user can individually investigate printer devices to ascertain their color management status and take any appropriate actions to address or otherwise mitigate issues associated with the device. For example, here, one of the printers is listed with a color code of red. By selecting and clicking on this particular printer (as indicated), a description of the highlighted device can be provided in window 506, along with an explanation of why the device has a red color code and any actions that a user should perform to mitigate this rating.

In this particular example, "add" and "remove" buttons are provided to enable a user to add or remove particular devices, applications or components from the color management analysis. For example, if the user has an old black and white printer, they may wish to remove this from the analysis so their printer type is not continually rated with a red code.

Assume now that the user clicks on the "All Profiles" tab. By doing so, a user interface is presented that can allow a user to view and manage profiles associated with their system. As an example, consider FIG. 6 which illustrates an example user interface in accordance with one or more embodiments, generally at 600. Here, a number of different profiles are viewable along with their associated file names. For example, using this specific interface, a user can view their device profiles, viewing condition profiles, gamut mapping profiles, as well as other relevant profiles that make up the system. Further, "add" and "remove" buttons are provided and enable the user to, respectively, add or remove profiles. By clicking on a particular profile, the user can also view, in a description area, a description of the profile, when it was created, the relevant color space associated with the profile, the device model with which the profile is employed as well as other relevant information.

Recall from the FIG. 4 user interface, that a user can also view and manipulate color management information associated with various applications or system components under the applications and components category 404. In one or more embodiments, if the user clicks on the applications type under this category, they can be exposed to an experience which is generally analogous to the one described above with regard to printers. That is, they can see a breakdown of the individual applications on their system, as well as a listing of their individual statuses. By clicking on individual displayed applications, the user can further be exposed to color management information associated with the individual application similar to the manner described in connection with FIG. 5.

Figure 6:
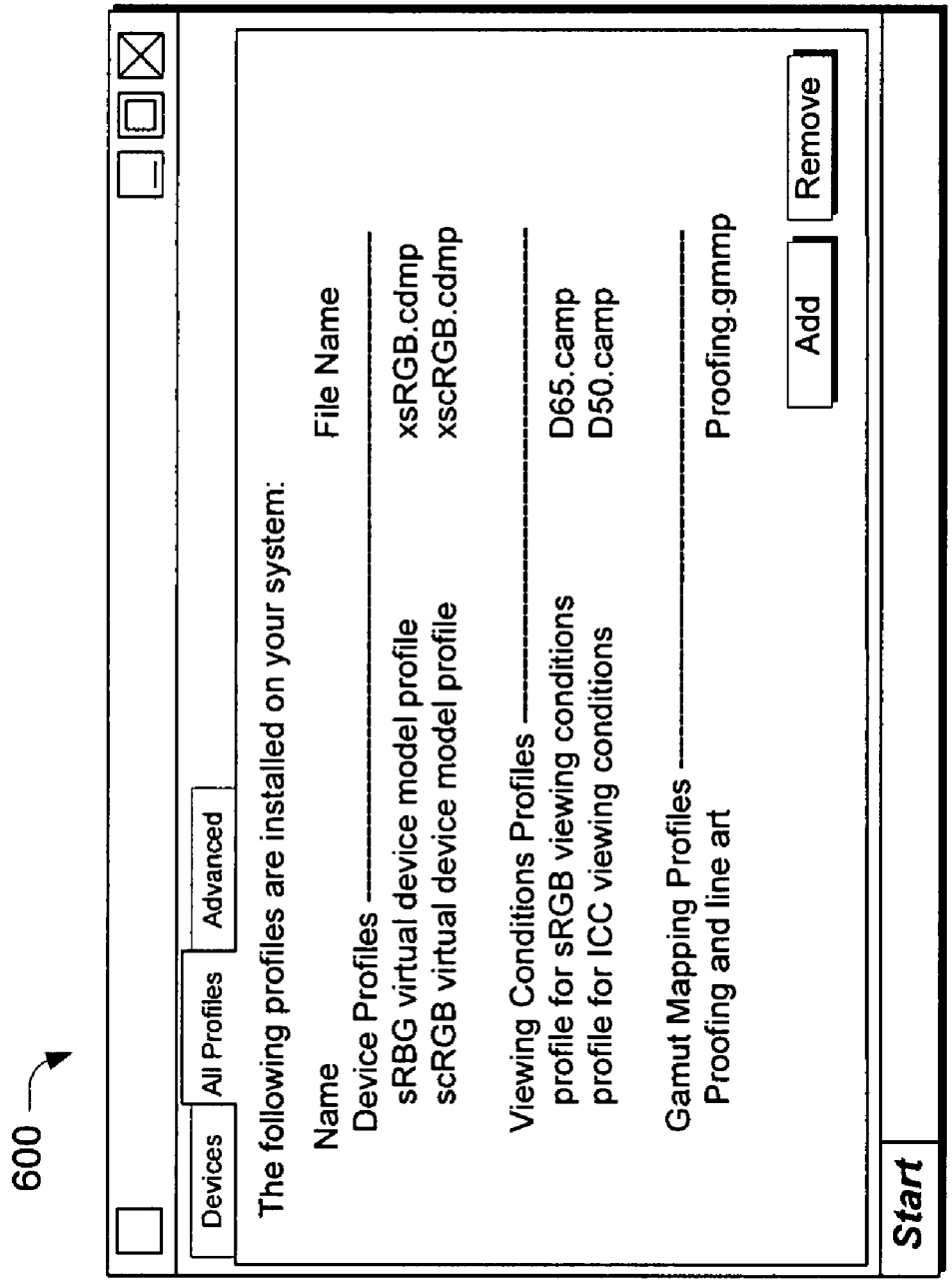
FIG. 6 illustrates an example user interface in accordance with one or more embodiments.
Figure 7:
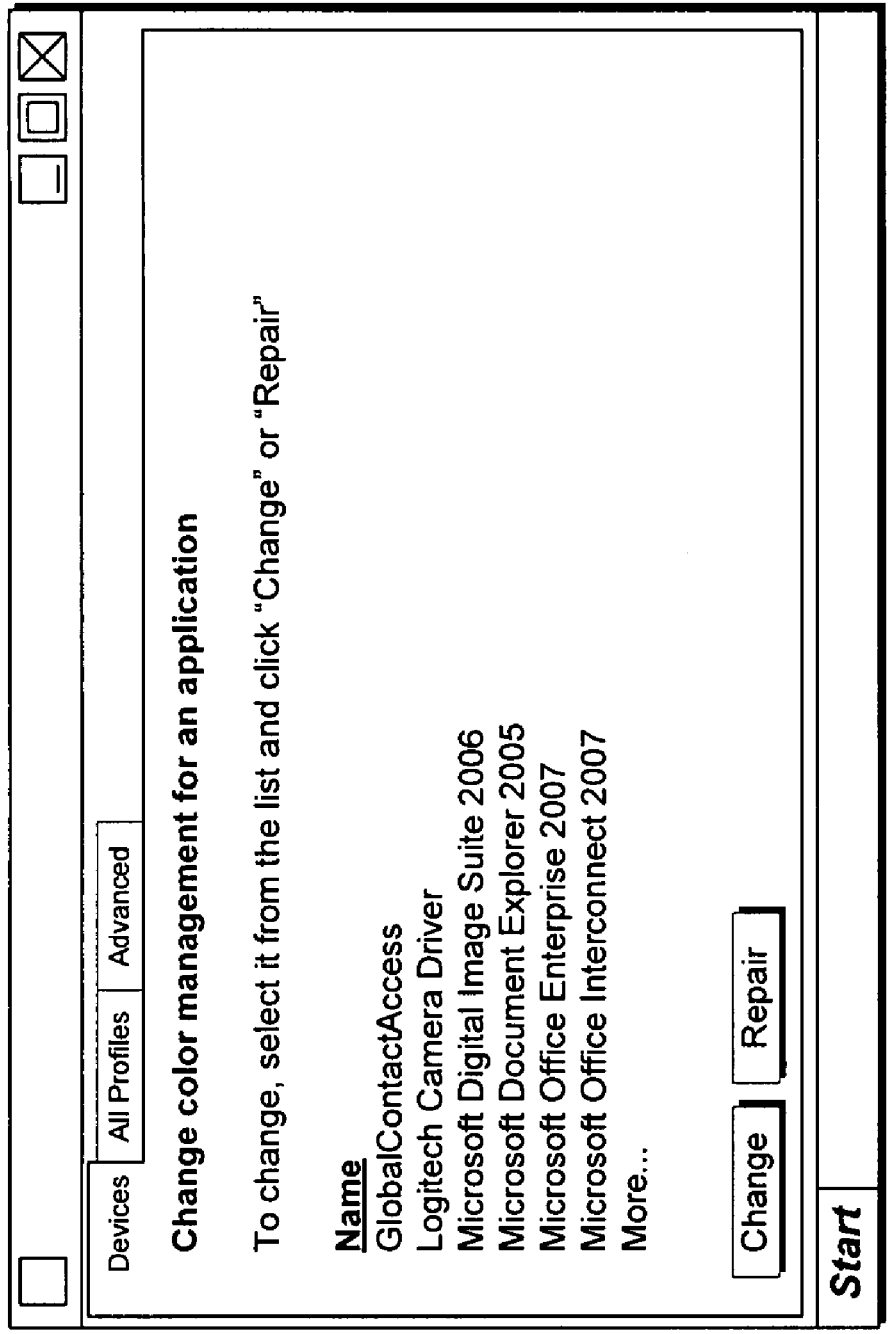
FIG. 7 illustrates an example user interface in accordance with one or more embodiments.

In addition, one of the user interfaces that can be presented to the user is one that enables the user to change color management for one or more of their devices, applications or components. In one or more embodiments, a user can access this user interface by clicking on the "Advanced" tab (FIGS. 5 and 6). As an example, consider FIG. 7 which illustrates a user interface in accordance with one or more embodiments, generally at 700. Here, the user interface includes instructions for enabling the user to change or repair a color profile associated with applications that reside on their system. Similar user interfaces can be presented for devices as well.

Recall from the FIG. 4 user interface that a backup and restore category 406 was provided to enable a user to backup and restore relevant information association with their color management system. Assume in this example that the user wishes to enter the backup and restore user interface. To do so, they simply double click on the category to be exposed to subsequent user interfaces that can navigate them through the backup and restore options.

Figure 8:
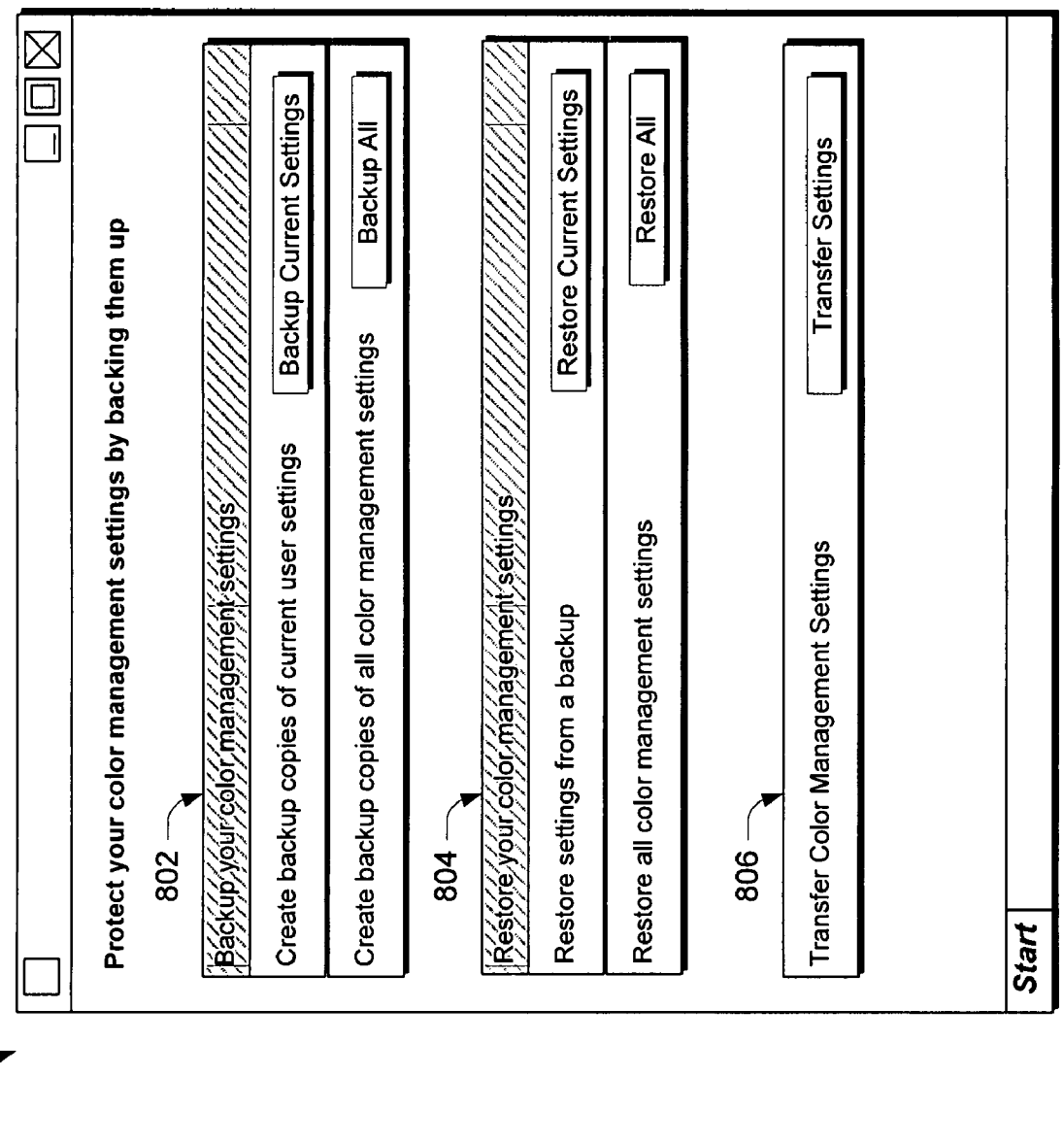
FIG. 8 illustrates an example user interface in accordance with one or more embodiments.

As an example, consider FIG. 8 which illustrates a user interface, in accordance with one or more embodiments, generally at 800. In this example, user interface 800 includes a backup portion 802, a restore portion 804 and a transfer portion 806.

In this example, backup portion 802 enables the user to create backup copies of their current user color management settings or all color management settings, as is evident from the display. Restore portion 804 enables the user to restore current user color management settings or all user color management settings, as is evident from the display. Transfer portion 806 enables the user to transfer their color management settings.

In this example, assume a user clicks on the "Transfer" option. In one or more embodiments, a user interface in the form of a Transfer Wizard can be presented to guide the user through the transfer process in an easy-to-understand way. As an example, consider FIG. 9 which illustrates an exemplary Transfer Wizard in accordance with one or more embodiments, generally at 900. Using this Wizard, the user can be navigated through a step-by-step transfer process in which they can transfer color management settings from one computer to another. Likewise, the user can also transfers settings between applications and/or components if they so desire.

Example Method

FIG. 10 is a flow diagram that describes steps in a method in accordance with one or more embodiments. The method can be performed in connection with any suitable hardware, software, firmware or combination thereof. In one or more embodiments, the method can be performed by a suitably configured color management module, such as module 110 in FIG. 1.

Step 1000 ascertains the color management status of multiple sources of color management information. Any suitable sources and number of sources can be utilized. In one or more embodiments, the sources can comprise one or more devices, applications and/or components in a computing system. The color management status of the sources can be ascertained in any suitable way examples of which are provided above. Step 1002 aggregates the color management statuses of the multiple sources. Any suitable aggregation method can be used examples of which are provided above. Step 1004 presents one or more user interfaces that provide an indication of the aggregated color management status. Any suitable user interface can be provided. In one or more embodiments, the user interface can include color coding to visually represent the color management status of the system and/or its various constituent parts.

Example System

FIG. 11 illustrates an example computing device 1100 that can implement the various embodiments described above. Computing device 1100 can be, for example, computing device 102 of FIG. 1 or any other suitable computing device.

Computing device 1100 includes one or more processors or processing units 1102, one or more memory and/or storage components 1104, one or more input/output (I/O) devices 1106, and a bus 1108 that allows the various components and devices to communicate with one another. Bus 1108 represents one or more of any of several types of bus structures, including a memory bus or memory controller, a peripheral bus, an accelerated graphics port, and a processor or local bus using any of a variety of bus architectures. Bus 1108 can include wired and/or wireless buses.

Memory/storage component 1104 represents one or more computer storage media. Component 1104 can include volatile media (such as random access memory (RAM)) and/or nonvolatile media (such as read only memory (ROM), Flash memory, optical disks, magnetic disks, and so forth). Component 1104 can include fixed media (e.g., RAM, ROM, a fixed hard drive, etc.) as well as removable media (e.g., a Flash memory drive, a removable hard drive, an optical disk, and so forth).

One or more input/output devices 1106 allow a user to enter commands and information to computing device 1100, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Conclusion

Various embodiments described above provide a user interface system that can expose end users and others to color management information in an easy-to-understand manner. In one or more embodiments, the user interface system can provide information that allows the user to easily ascertain whether a device, component or application is color managed, and the status of the device, component or application. Further, the user interface system can enable the user to access links that provide additional information and/or diagnostic help in the event a color management issue is identified.

In one or more embodiments, the user interface system comprises a collection of hierarchically-arranged user interface windows that can enable a user to quickly drill down to appropriate levels associated with color management of their device, component or application. The hierarchically-arranged user interface windows thus provide an intuitive and logical color management solution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
ascertaining color management status of multiple sources of color management information associated with a computing device, the color management status based, at least in part, on a determination of whether at least one source of the multiple sources is designed to meet or exceed a color management standard associated with a particular company;
aggregating color management statuses of the multiple sources;
presenting one or more user interfaces that:
describe whether one or more sources are color managed;
enable a user to access links that provide additional information and diagnostic help in an event a color management issue is identified; and
enable one or more sources to be added and removed from color management analysis.

2. The method of claim 1, wherein at least some of the user interfaces include color coding states to indicate the color management statuses.

3. The method of claim 1, wherein said one or more user interfaces comprise a collection of hierarchically-arranged user interface windows.

4. The method of claim 3, wherein at least some of the hierarchically-arranged user interface windows include color coding states to indicate color management statuses.

5. The method of claim 4, wherein at least some color coding states are associated with device types and/or application and component types.

6. The method of claim 4, wherein at least some of the color coding states are associated with individual instances of devices, applications or components.

7. A computer-implemented method comprising:
ascertaining color management status of multiple sources of color management information associated with a computing device, the ascertaining color management status comprising ascertaining whether at least one source of the multiple sources can be color managed by ascertaining whether a color profile can be associated with the at least one source, the color management status based, at least in part, on a determination of whether at least one source of the multiple sources is designed to meet or exceed a color management standard associated with a particular company; and
presenting a user interface system comprising a collection of hierarchically-arranged user interface windows that provide color management information associated with the multiple sources, wherein at least one of the user interface windows is configured to enable transfer of color management settings from a computer to another computer and at least one of the user interface windows is configured to enable one or more devices, applications or components to be added and removed from color management analysis.

8. The method of claim 7, wherein at least some of the windows include color coding states to indicate color management status.

9. The method of claim 7, wherein the user interface system comprises a clickable, color-coded icon that can be used to access the hierarchically-arranged user interface windows.

10. The method of claim 9, wherein the clickable, color-coded icon aggregates color management status across the multiple sources.

11. The method of claim 7, wherein at least one of the user interface windows lists categories that include a devices category associated with one or more device type, and an applications and components category associated with one or more application type and one or more component type.

12. The method of claim 11, wherein said at least one user interface window includes a backup and restore category that enables a user to backup or restore information associated with color management of their system.

13. The method of claim 11, wherein at least some of the categories are associated with color codes that indicate color management status of its associated category.

14. The method of claim 11, wherein at least some of the types are associated with color codes that indicate color management status of its associated type.

15. The method of claim 11, wherein said at least one user interface window can enable the user to display color management status associated with individual instances of a type.

16. The method of claim 15, wherein displayed instances of a type include color code information that describes the color management status of that instance.

17. A system comprising:
one or more computer-readable hardware storage media;
a color management module embodied on the one or more computer-readable hardware storage media, wherein the color management module is configured to:
provide multiple user interfaces at least some of which have multiple color coded states to indicate color management status associated with a system, wherein at least one user interface provides an indication of aggregated color management status of multiple sources of color management information associated with the system, the color management status based, at least in part, on a determination of whether at least one source of the multiple sources is designed to meet or exceed a color management standard associated with a particular company, wherein at least one user interface enables transfer of color management settings from the system to another system and wherein at least one user interface enables one or more sources of color management information to be added and removed from color management analysis; and
ascertain whether one or more sources of color management information has an associated color profile.

18. The system of claim 17, wherein said at least one user interface includes a clickable icon.

19. The system of claim 18, wherein the clickable icon is color coded to provide an aggregated indication of color management status of the system.

20. The system of claim 18, wherein the clickable icon is clickable to access a collection of hierarchically-arranged user interface windows that provide color management information associated with multiple devices, applications and/or components.

* * * * *